Sept. 29, 1925.

M. KOMINSKI

BELT ATTACHMENT FOR MOTOR VEHICLES

Filed June 19, 1923

1,555,715

INVENTOR
Michael Kominski
BY H. G. Manning
ATTORNEY

Patented Sept. 29, 1925.

1,555,715

UNITED STATES PATENT OFFICE.

MICHAEL KOMINSKI, OF NEW BRITAIN, CONNECTICUT.

BELT ATTACHMENT FOR MOTOR VEHICLES.

Application filed June 19, 1923. Serial No. 646,432.

*To all whom it may concern:*

Be it known that I, MICHAEL KOMINSKI, a citizen of the United States, and a resident of New Britain, county of Hartford, and State of Connecticut, have invented certain new and useful Improvements in Belt Attachments for Motor Vehicles, of which the following is a specification.

This invention relates to power attachments for motor vehicles, and more particularly to an attachment for utilizing the power of a "Ford" automobile for driving a belt to operate various machines, such as rotary wood-saws, silo-cutters and the like.

One object of the invention is to provide a power attachment which may be quickly and easily attached to and detached from the motor vehicle upon which it is used.

A further object is to provide a power attachment having an auxiliary stud shaft arranged in alinement with the crank shaft of the engine and coupled thereto, and in which the stud shaft is provided with a driving pulley.

A further object is to provide a power attachment of the above nature, in which the stud shaft is mounted to rotate in a bearing bracket having integral side arms which are adapted to be connected to the radiator support.

A further object is to provide a power attachment of the above nature which will be simple, cheap to manufacture, easy to manipulate, comparatively fool-proof, and which will be very efficient and durable when in use.

Figure 1:
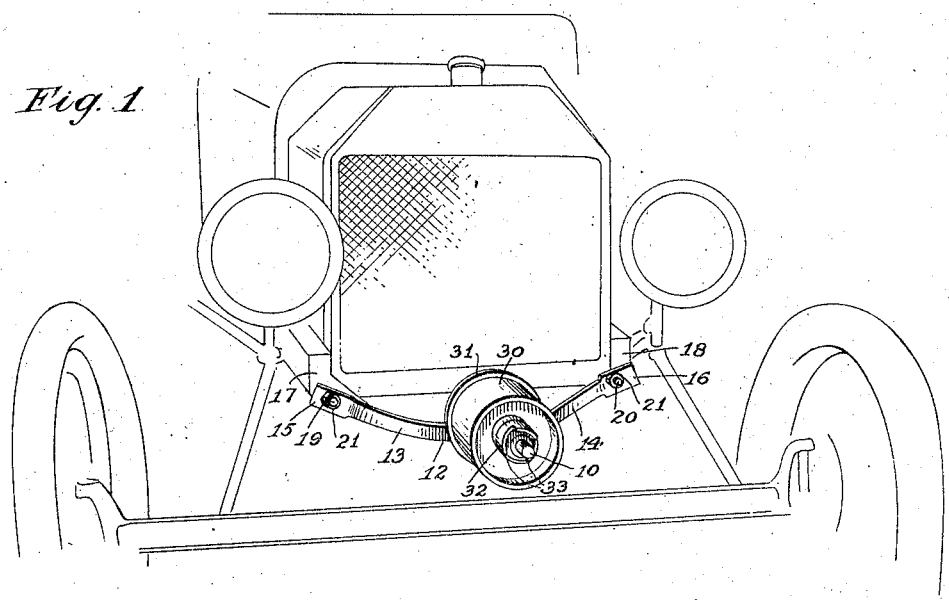
Fig. 1 represents a fragmentary perspective view of a "Ford" automobile provided with an attachment embodying this invention.
Figure 3:
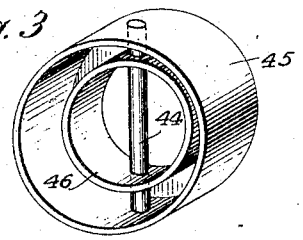

Fig. 3 is a perspective view of the fan-belt pulley.

Figure 4:
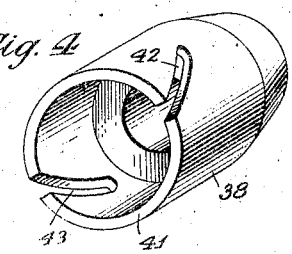

Fig. 4 is a perspective view of the coupling tube employed to detachably connect the stud shaft to the fan belt pulley and crank shaft.

Referring now to the drawings in which like reference numerals denote corresponding parts throughout the several views, the numeral 10 indicates a driving shaft which will be hereinafter designated as the "stud shaft."

The stud shaft 10 is mounted at its rear end in a bushing 11, customarily provided on "Ford" cars and within which the starting handle is normally fitted. The stud shaft 10 is also mounted at its intermediate section in an elongated bearing bracket 12, most clearly shown in Fig. 2. The bearing bracket 12 is provided with a pair of oppositely extended transverse side arms 13 and 14, having their end sections 15 and 16 flattened. The flat end sections 15 and 16 are adapted to lie in contact with the forward portions 17 and 18 of the radiator frame support and are secured to said portions 17 and 18 by means of bolts 19 and 20, upon which are threaded nuts 21.

The bearing bracket 12 is split longitudinally into two substantially semi-cylindrical sections, the section 22 comprising a removable cover-plate adapted to be secured to the main portion of said bracket 12 in any suitable manner as by bolts 23 and nuts 24.

The complementary semi-cylindrical sections 12 and 22 are provided on their interior with a pair of tubes 24$^a$ of Babbitt metal or other similar friction-reducing material. In order to permit the power attachment bearing to be lubricated the cover plate 22 is provided with an elongated oil hole 25 near the front of its top face, said oil hole being adapted to conduct oil to the interior of the upper friction-reducing tube 24$^A$. The bearing bracket 12 is held against rearward movement on the stud shaft 10 by means of a collar member 24$^b$ rigidly secured to said stud shaft by a set screw 24$^c$.

Figure 2:
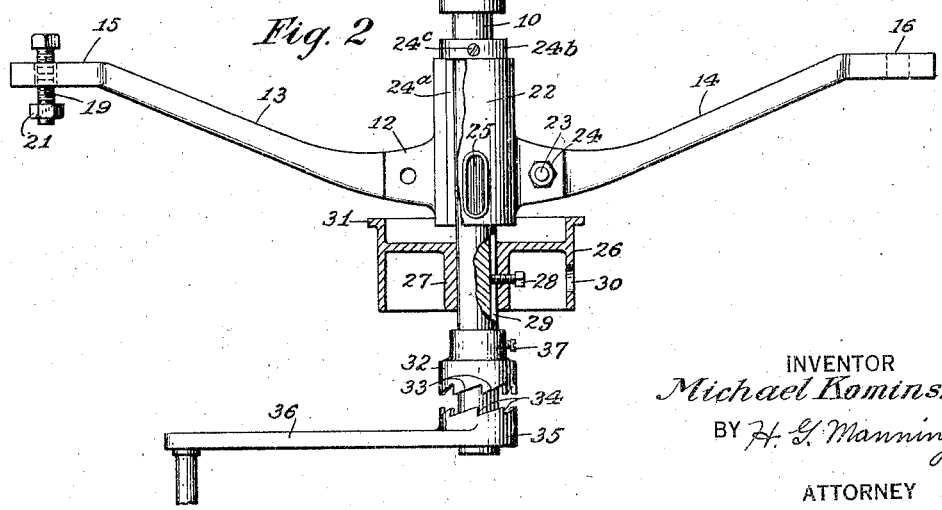
Fig. 2 is a top view, partly in section, of the power attachment showing the relative positions of the crank shaft and the starting handle.

A driving pulley 26 is mounted upon the stud shaft 10 immediately in front of the bearing bracket 12, and is provided with an interior concentric collar 27, as clearly shown in Fig. 2. A locking bolt 28 is threaded in one side of the collar 27 and is adapted to extend into a key-way slot 29 in the stud shaft 10, to hold the pulley 26 rigidly on said stud shaft. The outer rim of the pulley is provided with a wrench hole 30, opposite the location of said bolt 28, to permit said bolt to be readily manipulated by a wrench, not shown. The rear portion of the pulley rim is provided with an outwardly extending flange 31, which serves to prevent the belt from slipping off the pulley and coming in contact with the bearing bracket.

In order to permit the engine to be readily started, the stud shaft 10 is provided near its forward end, with a tubular ratchet 32, having an enlarged front section provided with a series of teeth 33, adapted to be engaged by a corresponding series of teeth 34, on a tubular hub 35 of a starting handle 36. The tubular ratchet 32, is adapted to be secured to the stud shaft 10, in any suitable manner, as by a set screw 37.

The rear end of the stud shaft 10 is provided with a coupling tube 38, said tube being detachably fitted upon said shaft and held against rotation relative thereto by a set screw 39 threaded into said tube and adapted to extend into a key-way 40, in the end of the stud shaft. The rear portion of the coupling tube is made hollow and of larger diameter than the forward portion thereof. The rear edge of the hollow portion of the coupling tube is provided with a pair of oppositely inclined slots 42 and 43, most clearly shown in Fig. 4, said slots being adapted to fit upon a transverse coupling rod 44, mounted in a fan belt pulley 45, and secured to the outer rim of said pulley. The fan belt pulley 45, is provided with a short concentric inner tube 46, which is adapted to loosely fit over the crank shaft 48, of the engine.

The crank shaft 48 has a transverse slot 47 in its end adapted to form a seat for the coupling rod 44, whereby the crank shaft will be positively coupled to the fan belt pulley and to the stud shaft 10.

In operation, when it is desired to install the power attachment upon a "Ford" car, a slot will first be cut in the end of the crank shaft and the fan belt pulley 45 placed in position. The stud shaft will next be inserted through the bushing 11 and the coupling tube 38 will then be fastened in position. The stud shaft will then be pushed backwardly until the slots in the coupling tube engage the coupling rod 44. The bearing bracket will then be slipped on the stud shaft and its cover plate bolted in position.

The side arms 13 and 14 of the bearing bracket, will next be secured to the radiator frame by means of the bolts 19, 20, and nuts 21. The driving pulley 26 and ratchet tube 32, will then be secured in position on the stud shaft 10, in front of the bearing bracket. The attachment is then ready for use, one of the front wheels of the car being preferably removed for this purpose.

When it is desired to operate a machine such as a rotary saw, it will merely be necessary for the operator to connect said machine with the pulley 26 by a suitable driving belt, not shown. The operator will then start the engine by rotating the starting handle 36, in the usual manner.

One advantage of the present invention is that when the power attachment is not in use, it may be readily removed from the vehicle. If desired, however, the attachment may be allowed to remain in operative position, as it does not in any way interfere with the operation of the vehicle. Another important advantage of this invention lies in the fact that the attachment is very compact in size and when in position is quite inconspicuous. While the attachment herein described is especially adapted to be applied to a "Ford" automobile, it is to be understood that it may also be used with various other types of motor vehicles.

While there has been disclosed in this specification one form in which the invention may be embodied, it is to be understood that this form is shown merely for the purpose of illustration, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a belt attachment for a motor vehicle, a transverse frame member underlying the front of the radiator of said vehicle, a bracket having a pair of inclined side arms secured at their ends directly to the ends of said transverse frame member, said bracket having an integral bearing section, a stud shaft journaled in said bearing section, a pulley carried on the front of said stud shaft, and means for detachably coupling the rear of said stud shaft to the motor of said vehicle.

2. In a belt attachment for a motor vehicle, a transverse frame member underlying the front of the radiator of said vehicle, a bracket having a pair of inclined side arms secured at their ends directly to the ends of said transverse frame member, said bracket having an integral bearing section, a stud shaft journaled in said bearing section, a pulley carried on the front of said stud shaft, and means for detachably coupling the rear of said stud shaft to the crank shaft of the motor of said vehicle, said stud shaft being adapted to underlie said radiator and being positioned in alinement with said crank shaft.

In testimony whereof I have affixed my signature to this specification.

MICHAEL X KOMINSKI.
his mark